United States Patent [19]

Katono et al.

[11] Patent Number: 5,672,655

[45] Date of Patent: Sep. 30, 1997

[54] PLASTIC OPTICAL MATERIAL AND PRODUCTION PROCESS THEREOF

[75] Inventors: Hiroki Katono; Masuhiro Shouji; Takeo Ogihara; Teruo Sakagami, all of Iwaki, Japan

[73] Assignee: Kureha Kagaku Kogyo Kabushiki Kaisha, Tokyo, Japan

[21] Appl. No.: 521,570

[22] Filed: Aug. 30, 1995

[30] Foreign Application Priority Data

Sep. 13, 1994 [JP] Japan ..................... 6-244579
Jan. 20, 1995 [JP] Japan ..................... 7-025868

[51] Int. Cl.$^6$ ..................................... C08K 5/098
[52] U.S. Cl. .................. 524/780; 524/398; 524/547; 524/560
[58] Field of Search ............................ 524/127, 398, 524/569, 780, 547

[56] References Cited

U.S. PATENT DOCUMENTS 3,692,688  9/1972  Castellion et al. .
5,337,185  8/1994  Meier et al. .

FOREIGN PATENT DOCUMENTS 0 144 182  6/1985  European Pat. Off. .
0 585 638  3/1994  European Pat. Off. .
6-118228   4/1994  Japan .
551 631    7/1974  Switzerland .

*Primary Examiner*—Jeffrey T. Smith
*Attorney, Agent, or Firm*—Frishauf, Holtz, Goodman, Langer & Chick, P.C.

[57] ABSTRACT

Disclosed herein are plastic optical materials having properties that rays in a specific visible range are absorbed, being low in specific gravity and easy to conduct processing or machining, and having excellent glare-proofness. One of the plastic optical material comprises an acrylic polymer containing a specific phosphate group represented by the formula $PO(OH)_n$— (n being 1 or 2) of 0.5–60%, and a metal ion component comprising a neodymium ion of 0.04–10 parts based on 100 parts of the acrylic polymer, and has properties that rays in a wavelength range about 580 nm are absorbed. Another plastic optical material comprises 100 parts of the same acrylic polymer, and 0.1–12 parts of a metal ion component composed of a manganese ion in a predominant amount and a neodymium ion, and has properties that rays in wavelength ranges of 400–500 nm and 555–605 nm are absorbed with high efficiency.

This plastic optical material is particularly suitable for use in plastic lenses for sunglasses.

A production process of the material is also disclosed which comprises the step of polymerizing a monomer mixture composed of a specific phosphate group-containing monomer and at least one copolymerizable monomer in the presence of at least one metallic compound of the desired kind and proportion.

8 Claims, No Drawings

PLASTIC OPTICAL MATERIAL AND PRODUCTION PROCESS THEREOF

BACKGROUND OF THE INVENTION

1. Field of the Invention

The present invention relates to plastic optical materials and a production process thereof, and more particularly to plastic optical materials, which have properties that rays in a specific wavelength range in a visible region are absorbed with high efficiency and are high in glare-proofness, and a production process thereof.

2. Description of the Background Art

Many attempts have heretofore been made to introduce a metal ion into a plastic material so as to impart optical properties specific to the metal ion to the plastic material. As the plastic material used as a medium for the metal ion, there are widely used acrylic resins excellent in optical properties such as transparency and mechanical properties such as strength.

As optical materials in which a metal ion has been incorporated to improve their optical properties, there have been developed, for example, optical materials making good use of the light absorptiveness of a neodymium ion, in which the neodymium ion is incorporated in an inorganic glass material in a dispersed state, and optical materials for sunglasses by way of example, making good use of the light absorptiveness of a manganese ion, in which the manganese ion is incorporated in an inorganic glass material in a dispersed state. It has been known that the neodymium ion exhibits absorptiveness in a wavelength range about a wavelength of 580 nm, and the manganese ion has properties that rays in a shorter wavelength range within a visible region are absorbed.

However, these optical materials made of inorganic glass have not only disadvantages from the viewpoint of physical properties in that they are high in specific gravity and hence heavy, and are brittle, but also many demerits from the viewpoint of production or processing and/or machining such as forming or molding, cutting or polishing.

The optical materials containing an effective amount of a manganese ion generally exhibit high blocking ability to the rays in the whole visible region, and so their light-transmission properties are lowered. Therefore, when they are used as optical materials for sunglasses, they show a marked tendency to darken visibility and hence make it difficult to get a good view, and so they have involved problems of increased danger attendant on difficulty in distinguishing colors of road signs, or rapid reduction of brightness in visibility when driving into a tunnel and the like.

On the other hand, plastic optical materials in which a neodymium ion is incorporated into a plastic material have also been investigated. However, uniform dispersibility of the neodymium ion in the plastic material is insufficient, and the tolerance for its content is also limited.

In view of the foregoing circumstances, there has been a strong demand for development of plastic optical materials which contain a specific metal ion such as a neodymium ion or manganese ion therein and can favorably exhibit particular optical properties inherent in such a metal ion.

SUMMARY OF THE INVENTION

The present invention has been completed in view of the foregoing circumstances and has as its first object the provision of a plastic optical material which contains a neodymium ion, has properties that rays in a wavelength range about a wavelength of 580 nm are absorbed with high efficiency, is low in specific gravity, has excellent glare-proofness and moreover is easy to process or machine such as when forming or molding, cutting and polishing.

The second object of the present invention is to provide a plastic optical material which contains a manganese ion and a neodymium ion, is sufficient in light-transmission property in the whole visible region, has excellent clearness in visibility and glare-proofness and is particularly suitable for use in plastic lenses for sunglasses.

The third object of the present invention is to provide processes capable of producing the above plastic optical materials with advantage.

In the first aspect of the present invention, there is thus provided a plastic optical material comprising 100 parts by mass of an acrylic polymer containing a specific phosphate group represented by the formula

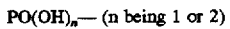
$PO(OH)_n$— (n being 1 or 2)

in a proportion of 0.5–60 mass %, and a metal ion component comprising a neodymium ion in a proportion of 0.04–10 parts by mass based on 100 parts by mass of the acrylic polymer.

In the plastic optical material according to the first aspect, one or more other metal ions may be contained in addition to the neodymium ion in such a proportion that a proportion of the neodymium ion amounts to at least 50 mass % of the whole metal ions, in other words, a proportion not higher than that of the neodymium ion contained.

In the second aspect of the present invention, there is also provided a plastic optical material comprising 100 parts by mass of an acrylic polymer containing the specific phosphate group represented by the above-mentioned formula in a proportion of 0.5–60 mass %, and 0.1–12 parts by mass of a metal ion component composed of a manganese ion $Mn^{2+}$ and a neodymium ion $Nd^{3+}$ and comprising the manganese ion in a predominant amount.

In the plastic optical material according to the second aspect, a mass ratio ($Mn^{2+}/Nd^{3+}$) of the manganese ion $Mn^{2+}$ to the neodymium ion $Nd^{3+}$ may preferably be within a range of 1–19.

In each of the plastic optical materials as above, the specific phosphate group contained in the acrylic polymer may preferably be chemically bonded to a molecular structure constituting the acrylic polymer. More specifically, the acrylic polymer may preferably be a copolymer obtained by polymerizing a monomer mixture composed of a monomer (hereinafter may referred to as "a specific phosphate group-containing monomer") represented by the following formula I:

$PO(OH)_nR_{3-n}$      I wherein R means a polymerizable functional group represented by the following formula II:

$CH_2=CXCOO(C_2H_4O)_m$—      II (X denotes a hydrogen atom or a methyl group, and m is an integer of 0–5) and n is 1 or 2, and at least one monomer copolymerizable therewith.

According to the present invention, there is further provided a process for producing the plastic optical material according to the first aspect, which comprises the step of polymerizing a monomer mixture composed of a monomer represented by the above-mentioned formula I and at least one monomer copolymerizable therewith, said mixture providing a copolymer containing the specific phosphate group in a proportion of 0.5–60 mass %, in the presence of a neodymium compound in such an amount that a proportion of a neodymium ion to be contained in a copolymer to be formed comes to 0.04–10 parts by mass based on 100 parts by mass of the copolymer.

In this polymerization, one or more other metal compounds may be caused to exist together with the neodymium compound in such an amount that a proportion of the other metal ions to be contained in the copolymer to be formed will be not higher than that of the neodymium ion to be contained.

According to the present invention, there is still further provided a process for producing the plastic optical material according to the second aspect, which comprises the step of polymerizing a monomer mixture composed of a monomer represented by the above-mentioned formula I and at least one monomer copolymerizable therewith, said mixture providing a copolymer containing the specific phosphate group in a proportion of 0.5–60 mass %, in the presence of metal compounds in such an amount that a proportion of a metal ion component, which is composed of a manganese ion $Mn^{2+}$ and a neodymium ion $Nd^{3+}$ and comprises the manganese ion in a predominant amount, to be contained in a copolymer to be formed comes to 0.1–12 parts by mass based on 100 parts by mass of the copolymer.

As described above, the plastic optical material according to the first aspect comprises the acrylic polymer containing the specific phosphate group in the specified proportion as a resin component, and the metal ion component comprising the neodymium ion in the specified proportion incorporated in this resin component, and so it has properties that rays in a wavelength range about a wavelength of 580 nm are absorbed with high efficiency, is excellent in glare-proofness and low in specific gravity and has excellent productivity in that it is easy to conduct processing or machining such as forming or molding, cutting and polishing. When other metal ions are also contained therein, such a plastic optical material is provided as an optical material having optical properties inherent in such other metal ions.

The plastic optical material according to the second aspect comprises the acrylic polymer containing the specific phosphate group as a resin component, and manganese and neodymium ions incorporated in this resin component in a state the manganese ion is in a predominant amount, and so it has properties that rays in a shorter wavelength range and a wavelength range of 550–605 nm in a visible region are absorbed with high efficiency. Therefore, improvement in definition based on the reduction in scattered light in the shorter wavelength range in a visible region and excellent glare-proofness can be achieved at the same time. In addition, the plastic optical material is low in specific gravity and also excellent in productivity in that it is easy to process or machine such as forming or molding, cutting and polishing. Owing to such properties, it can be favorably used as lenses for sunglasses, transparent members for goggles and the like.

The invention related to the plastic optical material according to the second aspect has been completed on the basis of the findings that in the plastic optical material comprising both manganese ion and neodymium ion in a state that the manganese ion is in a predominant amount, the outline of an object can be more clearly distinguished without greatly lowering brightness in visibility, and moreover glare-proofness is improved.

DETAILED DESCRIPTION OF THE INVENTION AND PREFERRED EMBODIMENTS

The present invention will hereinafter be described in detail.

[Plastic optical material according to the first aspect]

The plastic optical material according to the first aspect of the present invention comprises a resin component composed of an acrylic polymer containing the specific phosphate group in a specified proportion, and a metal ion component comprising a neodymium ion incorporated in the resin component in such a manner that a proportion of the neodymium ion comes to a specified proportion.

In this plastic optical material according to the first aspect, the specific phosphate group may be contained in an acrylic polymer either by dispersing a compound containing the specific phosphate group in the acrylic polymer or by chemically bonding the specific phosphate group to a molecular structure of a monomer constituting the acrylic polymer.

Since the metal ion component such as a neodymium ion, which will be described subsequently, is bonded to the specific phosphate group in the acrylic polymer in a coordinated state so as to become a stable state, it is however desirable that the specific phosphate group be bonded to the molecular structure of the acrylic polymer in a uniformly dispersed state. Such structure permits the inclusion of the metal ion in an amount sufficient to obtain the intended optical properties. For example, it is possible to fully uniformly disperse a neodymium ion in an amount required to obtain optical properties that rays in a wavelength range about a wavelength of 580 nm are absorbed sufficiently.

Examples of the monomer for obtaining the acrylic polymer include monofunctional acrylates and monofunctional methacrylates such as lower alkyl acrylates and lower alkyl methacrylates the alkyl groups of which have 1–8 carbon atoms, such as methyl acrylate, methyl methacrylate, ethyl acrylate and ethyl methacrylate, lower alkyl acrylates and lower alkyl methacrylates which have an alkyl group through an ethylene oxide group, such as ethoxyethyl acrylate and ethoxyethyl methacrylate, and modified alkyl acrylates and modified alkyl methacrylates in which the alkyl group is substituted by a glycidyl group or the like, such as glycidyl acrylate and glycidyl methacrylate; polyfunctional acrylates and polyfunctional methacrylates such as ethylene glycol diacrylate, ethylene glycol dimethacrylate, diethylene glycol diacrylate, diethylene glycol dimethacrylate, polyethylene glycol diacrylate, polyethylene glycol dimethacrylate, 1,4-butanediol diacrylate, 1,4-butanediol dimethacrylate, 2,2-bis[4-acryloxyethoxyphenyl]propane, 2,2-bis[4-methacryloxyethoxyphenyl]propane, trimethylol-propane triacrylate, trimethylolpropane trimethacrylate, pentaerythritol triacrylate, pentaerythritol trimethacrylate, pentaerythritol tetraacrylate and pentaerythritol tetramethacrylate; and the like.

In the present invention, a copolymer obtained by using, as an essential component, a specified amount of a specific phosphate group-containing monomer represented by the formula I, in which the specific phosphate group is bonded to its molecular structure, is preferred as the acrylic polymer because a sufficient amount of the metal ion such as a neodymium ion can be uniformly dispersed with ease as described above.

As represented by the formula II, the group R in the formula I of this specific phosphate group-containing monomer is an acryloyloxy group (in the case where X is a hydrogen atom) or a methacryloyloxy group (in the case where X is a methyl group) to which five or less ethylene oxide groups may be bonded. Here, the recurring number m of the ethylene oxide groups is an integer of 0–5. Any value of m exceeding 5 results in a copolymer greatly lowered in hardness and hence lacking in practicability as an optical material.

The number n of the hydroxyl groups in the formula I is 1 or 2. A specific phosphate group-containing monomer in which the value of n is 1, i.e., a monomer in which the number of radical-polymerizable, ethylenically unsaturated bonds bonded to the phosphorus atom is 2, has crosslink-polymerizability. On the other hand, in a specific phosphate group-containing monomer in which the value of n is 2, the number of the ethylenically unsaturated bonds is 1. Such a monomer is high in bonding ability to the metal ion component such as a neodymium ion.

Accordingly, in order to obtain a plastic optical material capable of molding or forming by injection molding or extrusion, which is a common molding or forming process for thermoplastic resins, it is preferable to use a specific phosphate group-containing monomer in which the number of n is 2 in a higher mixing ratio. On the other hand, in order to obtain a plastic optical material high in bonding ability to metal ions such as a neodymium ion and permitting the production of a molded article high in surface hardness by cast holding, it is preferable to use a specific phosphate group-containing monomer in which the number of n is 1 in a higher mixing ratio. However, the molding or forming process for the plastic optical materials according to the present invention is not limited to the above-mentioned processes.

As described above, the value of n and the mixing ratio of the specific phosphate group-containing monomers may be selected according to the properties, molding or forming process and intended end application of the resulting optical material. The specific phosphate group-containing monomer in which the value of n is 1 and the specific phosphate group-containing monomer in which the value of n is 2 may preferably be used in combination. In particular, the combined use of these two kinds of the specific phosphate group-containing monomers in a molar ratio substantially equal to each other, for example, in a molar ratio of 45:55 to 55:45, is preferred because the solubility of the metal compound composed mainly of a neodymium compound in such a monomer mixture becomes high.

The acrylic polymer as a resin component of the plastic optical material according to the first aspect of the present invention may be a copolymer of these acrylate monomers with one or more other monomers copolymerizable therewith, for example, unsaturated carboxylic acids such as acrylic acid and methacrylic acid, aromatic vinyl compounds such as styrene, α-methylstyrene, halogenated styrenes, methoxystyrene and divinylbenzene, and the like as needed.

As described above, a copolymer comprising, as an essential component, the specific phosphate group-containing monomers represented by the formula I may preferably be used as the acrylic polymer component constituting the plastic optical material. No particular limitation is imposed on the copolymerizable monomers used herein so far as they satisfy the following requirements:

(1) being miscible and soluble uniformly with the monomers represented by the formula I;

(2) having good radical polymerizability with such monomers; and (3) being able to provide an optically transparent copolymer.

Specific examples of these copolymerizable monomers may be selected from the group of the monomers already mentioned as the monomers used in obtaining the acrylic polymer constituting the plastic optical material according to the first aspect and as the monomers used in the copolymerization.

These monomers may be used either singly or in any combination thereof.

The proportion of the specific phosphate group-containing monomer to be used is desirably such a proportion that a proportion of the specific phosphate group contained in the resulting copolymer comes to 0.5–60 mass %, preferably 0.5–40 mass %, and specifically, at least about 3 mass %, preferably 3–80 mass % of the monomer mixture. Since these specific phosphate group-bonded acrylic monomers are monomers high in radical polymerizability, almost all the monomers subjected to the polymerization are considered to be polymerized into a copolymer.

If the proportion of the specific phosphate group-containing monomers is too low, the resulting acrylic polymer has difficulty in uniformly dispersing a required amount of a metal ion component composed mainly of a neodymium ion therein if used as it is. Therefore, plastic optical material excellent in glare-proofness can not be provided.

The acrylic polymer constituting the plastic optical material can be obtained by radical-polymerizing a monomer mixture containing, as an essential component, the specific phosphate group-containing monomers in the specified proportion. No particular limitation is imposed on the radical polymerization process employed. Any known process making use of a usual radical polymerization initiator, such as bulk (cast) polymerization, suspension polymerization, emulsion polymerization or solution polymerization, may be employed.

In the plastic optical material according to the first aspect of the present invention, a metal ion component composed of a neodymium ion is contained as another essential component in the acrylic polymer.

In the plastic optical material, proportion of the neodymium ion to be contained is 0.04–10 parts by mass based on 100 parts by mass of the acrylic polymer. Any proportion of the neodymium ion lower than 0.04 part by mass results in an optical material showing insufficient light absorptiveness in a wavelength range about a wavelength of 580 nm. On the other hand, any proportion exceeding 10 parts by mass results in an acrylic polymer having difficulty in uniformly dispersing the neodymium ion therein.

The metal ion component composed mainly of the neodymium ion may be incorporated in the acrylic polymer either by adding a neodymium compound to the acrylic polymer or by adding a neodymium compound to the monomer mixture for the acrylic polymer and polymerizing the mixture.

As the neodymium compound constituting the metallic compound, there may be used various compounds. Examples thereof include anhydrides and hydrates of neodymium acetate, neodymium chloride, neodymium nitrate, neodymium oxide, neodymium-2,4-pentanedionate, neodymium trifluoropentanedionate, neodymium fluoride, neodymium sulfate and the like. The neodymium compounds are not limited to these compounds only.

In the plastic optical material according to the first aspect of the present invention, other metal ions may be contained as a part of the metal ion component in addition to the neodymium ion. Compounds containing a metal ion of sodium, potassium, calcium, iron, manganese, cobalt, magnesium, nickel or the like may be used as supply sources of metal ions for providing these other metal ions as necessary for the end application intended.

If the metal ions other than the neodymium ion are contained as described above, it is preferable that a proportion of the neodymium ion amount to at least 50 mass % of the whole metal ions. If the proportion of the neodymium ion is lower than 50 mass % of the whole metal ions, no optical material excellent in glare-proofness can be provided.

More specifically, the metal ions are supplied by incorporating a compound comprising a trivalent neodymium ion and at least one Compound comprising another metal ion under conditions that these compounds are contained within the above-described proportion.

In the first aspect of the present invention, the proportion of the metallic compounds, including metallic compounds as supply sources of the other metal ions other than the neodymium compound, based on 100 parts by mass of the acrylic polymer is practically 0.05–25 parts by mass, preferably 0.1–20 parts by mass, more preferably 0.3–10 parts by mass. If the proportion of the metallic compounds to be used is too low, the resulting optical material fails to sufficiently realize the intended optical properties. On the other hand, any proportion exceeding 25 parts by mass is accompanied by difficulty in uniformly dispersing the metal ions in the acrylic polymer.

No particular limitation is imposed on the process of producing the acrylic polymer containing the metal ion component therein. However, the following two processes may be mentioned as preferred processes:

(1) a process comprising adding the above-described metallic compounds to the monomer mixture prior to the radical polymerization thereof, thereby preparing a monomer composition composed of the specific phosphate group-containing monomer, at least one copolymerizable monomer and the metallic compounds, and radical-polymerizing this monomer composition; and (2) a process comprising adding the metallic compounds to an acrylic polymer obtained by polymerizing the monomer mixture containing the specific phosphate group-containing monomer and blending the resultant mixture.

In the process (2), specifically, there may be used (a) a process in which the acrylic polymer is heated and melted, and the metallic compounds are added to the melt to blend the resulting mixture, (b) a process in which the acrylic polymer is dissolved in an organic solvent or the like, and the metallic compounds are added to this solution to blend the resulting mixture, or the like.

An optical material comprising the acrylic polymer containing the metal ion component composed mainly of a neodymium can be obtained by such a process as described in the above (1) or (2).

The thus-obtained plastic optical material according to the first aspect of the present invention has properties that rays in a wavelength range about a wavelength of 580 nm are absorbed with high efficiency, and is excellent in glare-proofness. This plastic optical material is easy to be molded or formed into the form of a plate, sheet, film, disc, lens or the like.

Accordingly, this plastic optical material is suitable for use in optical products such as sunglasses, goggles, spectacle lenses, display filters and optical filters, or as a material for them. It is also possible to form this plastic optical material into a sheet or film and laminate this sheet or film with a transparent material such as glass or a plastic, thereby constituting a composite material, or to dissolve this plastic optical material in an organic solvent or the like and use the resultant liquid composition as a coating fluid.

[Plastic optical material according to the second aspect]

The plastic optical material according to the second aspect of the present invention comprises a resin component composed of an acrylic polymer containing the specific phosphate group, and a metal ion component comprising both manganese ion and neodymium ion as metal ions in a state that the manganese ion is in a predominant amount.

Since the resin component of this plastic optical material according to the second aspect is composed of the same acrylic polymer or copolymer as in the plastic optical material according to the first aspect, its detailed description is omitted. As with the neodymium ion, the manganese ion is also contained in this acrylic polymer in a state coordinated with the specific phosphate group, it is desirable that the specific phosphate group be chemically bonded to the molecular structure of the acrylic polymer in a uniformly dispersed state. This structure makes it possible to enhance the uniform dispersibility of the metal ion component.

The plastic optical material according to the second aspect contains both manganese ion and neodymium ion as metal ions in a state the manganese ion is in a predominant amount.

Such metal ions composed of the manganese ion and neodymium ion can be incorporated in the acrylic polymer either by adding a manganese compound and a neodymium compound to the acrylic polymer in such a proportion that the manganese ion is in a predominant amount or by adding both compounds to a monomer mixture thereof and then polymerizing the monomer mixture.

The term "the manganese ion is in a predominant amount" as used herein means that a proportion of the manganese ion contained amounts to at least 50 mass % of the whole metal ion component, and is not lower than that of the neodymium ion contained. A mass ratio ($Mn^{2+}/Nd^{3+}$) of the manganese ion $Mn^{2+}$ to the neodymium ion $Nd^{3+}$ may preferably be within a range of 1–19, more preferably 1–12, most preferably 1–3. If the proportion of the manganese ion is lower than 50 mass %, or the value of the ratio ($Mn^{2+}/Nd^{3+}$) exceeds 19, the resulting optical material becomes insufficient in light absorptiveness in the shorter wavelength range in a visible region or in a wavelength range about a wavelength of 580 nm, and so balance between quantities of transmitted light in both wavelength ranges is destroyed, resulting in difficulty in maintaining an adequate balance among brightness in visibility, definition of the outline of an object and glare-proofness.

The manganese and neodymium compounds used as supply sources of the manganese and neodymium ions, respectively, are mixed and used under conditions satisfying the above-described proportion of the manganese ion. Further, such other metallic compounds as contained, for example, as impurities may be contained in a small amount in these metallic compounds so far as they do not impede the objects and advantageous effects of the present invention.

As the manganese compound constituting the metallic compound, there may be used various compounds. Examples thereof include anhydrides and hydrates of manganese acetate, manganese acetylacetonate, ammonium manganese sulfate, manganese benzoate, manganese borate, manganese borofluoride, manganese bromide, manganese carbonate, manganese chloride, manganese 4-cyclohexylbutyrate, manganese 2-ethylhexylate, manganese formate, manganese naphthenate, manganese nitrate, manganese oxalate, manganese oxide, manganese phosphate, manganese stearate, manganese sulfate, manganese phthalocyanine, manganese salicylate, manganese succinate and manganese tetrafluoroborate.

Examples of the neodymium compound may include the same neodymium compounds as those already mentioned as the supply source of the neodymium ion for the plastic optical material according to the first aspect.

In the plastic optical material according to the second aspect of the present invention, the proportion of the metallic ion component, in which the manganese ion is in a predominant amount, to be used is 0.1–12 parts by mass, preferably 1–10 parts by mass, most preferably 1–7 parts by mass in terms of the total metal ions based on 100 parts by mass of the acrylic polymer.

If the proportion of the metal ion component to be used is lower than 0.1 part by mass, the resulting optical material becomes insufficient in light absorptiveness in a specific wavelength range in a visible region. Such a material is unsuitable for use as an optical material for sunglasses.

On the other hand, any proportion exceeding 12 parts by mass is not preferred because it is difficult to disperse uniformly the metallic compounds in the copolymer comprising the specific phosphate group-containing monomer in such a great amount.

The description as to the process for adding the metallic compounds supplying the manganese and neodymium ions and others is the same as that described as to the neodymium ion in the description of the plastic optical material according to the first aspect.

The plastic optical material according to the second aspect of the present invention has absorption characteristics that the quantities of transmitted light in wavelength ranges of from 400 nm to 500 nm and from 555 nm to 605 nm are reduced, and is excellent in glare-proofness. This plastic optical material is easy to be molded or formed into the form of a plate, sheet, film, disc, lens or the like.

Accordingly, this plastic optical material has optical properties different from the plastic optical material according to the first aspect, but may be applied to the same uses as in the plastic optical material according to the first aspect. In particular, this plastic optical material according to the second aspect is useful as an optical material for sunglasses in that it has good visible light-transmission property and excellent glare-proofness.

The present invention will hereinafter be described with reference to the following examples. However, this invention is not limited to and by these examples.

All designations of "part" or "parts" and "%" as will be used in the following examples mean part or parts by mass and mass % except for light transmittance, respectively.

Example A1

A first specific acrylic monomer containing the specific phosphate group bonded as represented by the following formula III in an amount of 31.5 parts and a second specific acrylic monomer containing the specific phosphate group bonded as represented by the following formula IV in an amount of 18.5 parts were thoroughly mixed with 29 parts of methyl methacrylate, 20 parts of diethylene glycol dimethacrylate and 1 part of α-methylstyrene to prepare a monomer mixture.

To this monomer mixture, were added 2.5 parts of neodymium acetate monohydrate (proportion of a neodymium ion based on 100 parts of the monomer mixture: 1.1 parts), and the resultant mixture was stirred and mixed at 70° C. to fully dissolve the neodymium compound in the monomer mixture, thereby obtaining a monomer composition in which neodymium acetate monohydrate was dissolved in the monomer mixture.

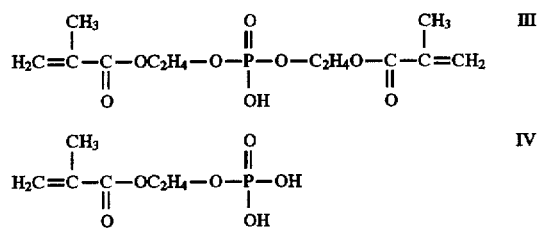

To the monomer composition thus prepared, were added 2.0 parts of t-butyl peroxyoctanoate. The resultant mixture was subjected to cast polymerization by heating it at 45° C. for 2 hours and then at 50° C. for 2 hours, further heating from 50° C. to 60° C. over 6 hours, from 60° C. to 80° C. over 5 hours and then from 80° C. to 100° C. over 3 hours, and holding the mixture at 100° C. for 2 hours successively, thereby producing a plastic optical material A1 in the form of a plate 3 mm thick, which was composed of a crosslinked acrylic polymer containing a neodymium ion.

The proportions of the specific phosphate group and neodymium ion contained in this optical material A1 were 17.2% and 1.04%, respectively. This optical material A1 had a specific gravity as low as 1.322 and a refractive index of 1.5024.

Further, a spectral transmittance curve of the optical material A1 in the form of a plate 3 mm thick was determined by means of a spectrophotometer. As a result, it was found that the light transmittances in a wavelength range about a wavelength at which luminosity factor becomes highest, i.e., 580 nm are about 62%, and it has properties that rays in this wavelength range are absorbed with higher efficiency compared with a plastic material a1 according to Comparative Example a1 containing no neodymium ion, which will be described subsequently.

Comparative Example a1

A plastic material a1 in the form of a plate formed of an acrylic polymer was produced in the same manner as in Example A1 except that neodymium acetate monohydrate was omitted.

The spectral transmittances of this plastic material a1 were measured in the same manner as in Example A1. As a result, its light transmittances in a wavelength range about a wavelength of 580 nm were about 92%, and so light absorbing ability was scarcely found in this wavelength range.

Comparative Example a2

A plastic material a2 in the form of a plate formed of an acrylic polymer was produced in the same manner as in Example A1 except that 99 parts of methyl methacrylate were mixed with 1 part of α-methylstyrene to prepare a monomer mixture containing no specific phosphate group, and this monomer mixture was used to prepare a monomer composition.

The spectral transmittances of this plastic material a2 were measured in the same manner as in Example A1. As a result, light absorption was scarcely observed in a wavelength range about a wavelength of 580 nm. It seemed that neodymium ion could not be incorporated in the plastic material a2 owing to absence of the specific phosphate group in the copolymer.

Example A2

A plastic optical material A2 was produced in the same manner as in Example A1 except that 49 parts of 2-hydroxyethyl methacrylate were used to prepare a monomer mixture in place of 29 parts of methyl methacrylate and 20 parts of diethylene glycol dimethacrylate in Example A1.

The proportions of the specific phosphate group and neodymium ion contained in this optical material A2 were 17.2% and 1.04%, respectively.

The spectral transmittances of this optical material A2 were measured in the same manner as in Example A1. As a result, it was found that the light transmittances in a wavelength range about a wavelength of 580 nm are about 63%, and it has properties that rays in this wavelength range are absorbed with high efficiency. This optical material A2 had a specific gravity of 1.366 and a refractive index of 1.5068.

Example A3

A plastic optical material A3 in the form of a plate was produced in the same manner as in Example A1 except that 49 parts of methyl methacrylate were used to prepare a monomer mixture in place of 29 parts of methyl methacrylate and 20 parts of diethylene glycol dimethacrylate, and that 1.5 parts of neodymium acetate monohydrate and 1.0 part of nickel acetate tetrahydrate were used to prepare a monomer composition in place of 2.5 parts of neodymium acetate monohydrate in Example A1.

The proportions of the specific phosphate group, neodymium ion and nickel ion contained in this optical material A3 were 17.2%, 0.622% and 0.24%, respectively.

The spectral transmittances of this optical material A3 were measured in the same manner as in Example A1. As a result, it was found that the light transmittances in a wavelength range about a wavelength of 580 nm are about 71%, and it absorbs rays in this wavelength range with higher efficiency compared with the plastic material a1 according to Comparative Example a1 and the plastic material a2 according to Comparative Example a2. Light absorption attributable to the nickel ion was also observed in a wavelength range about a wavelength of 420 nm. This optical material A3 had a specific gravity of 1.335 and a refractive index of 1.4999 and was colored yellowish green.

Example A4

A plastic optical material A4 in the form of a plate was produced in the same manner as in Example A1 except that 49 parts of methyl methacrylate were used to prepare a monomer mixture in place of 29 parts of methyl methacrylate and 20 parts of diethylene glycol dimethacrylate in Example A1.

The proportions of the specific phosphate group and neodymium ion contained in this optical material A4 were 17.2% and 1.04%, respectively.

The spectral transmittances of this optical material A4 were measured in the same manner as in Example A1. As a result, it was found that the light transmittances in a wavelength range about a wavelength of 580 nm are about 63%, and it hence has light absorptiveness sufficient to exhibit good glare-proofness. This optical material A4 had a specific gravity of 1.320 and a refractive index of 1.5000.

Example A5

A monomer mixture was prepared by using 20.8 parts of the first specific acrylic monomer represented by the formula III, 12.2 parts of the second specific acrylic monomer represented by the formula IV, 66 parts of methyl methacrylate and 1 part of α-methylstyrene. To this monomer mixture, were added 4 parts of neodymium acetate monohydrate, and the resultant monomer composition was treated in the same manner as in Example A1, thereby producing a plastic optical material A5 in the form of a plate.

The proportions of the specific phosphate group and neodymium ion contained in this optical material A5 were 11.2% and 1.64%, respectively.

The spectral transmittances of this optical material A5 were measured in the same manner as in Example A1. As a result, it was found that the light transmittances in a wavelength range about a wavelength of 580 nm are about 45%, and it hence has sufficient light absorptiveness. This optical material A5 had a specific gravity of 1.309 and a refractive index of 1.4964.

Example A6

The first specific acrylic monomer represented by the formula III in an amount of 4.4 parts and the second specific acrylic monomer represented by the formula IV in an amount of 2.6 parts were mixed with 37 parts of methyl methacrylate, 20 parts of diethylene glycol dimethacrylate and 36 parts of 2-hydroxyethyl methacrylate, which were monomers copolymerizable with the first mentioned monomers.

To the monomer mixture thus obtained, was added 0.7 part of neodymium acetate monohydrate, and the resultant monomer composition was treated in the same manner as in Example A1, thereby producing a plastic optical material A6 in the form of a plate.

The proportions of the specific phosphate group and neodymium ion contained in this optical material A6 were 2.4% and 0.3%, respectively.

The spectral transmittances of this optical material A6 were about 83% in a wavelength range about a wavelength of 580 nm, and so it was found to have higher light absorbing power compared with the resin material a1 according to Comparative Example a1. This optical material A6 had a specific gravity of 1.260 and a refractive index of 1.5053.

Example A7

The first specific acrylic monomer represented by the formula III and the second specific acrylic monomer represented by the formula IV in such a proportion that a ratio between both monomers was the same as in Example 6A were used in an amount of 60 parts in total. These monomers were mixed with 10 parts of diethylene glycol dimethacrylate and 30 parts of 2-hydroxyethyl methacrylate, which were monomers copolymerizable with the first mentioned monomers, thereby preparing a monomer mixture. To this monomer mixture, were added 12 parts of neodymium acetate monohydrate, and the resultant monomer composition was polymerized in the same manner as in Example A1, thereby producing a plastic optical material A7 in the form of a plate.

The proportions of the specific phosphate group and neodymium ion contained in this optical material A7 were 21.2% and 5.1%, respectively.

The spectral transmittances of this optical material A7 were about 24% in a wavelength range about a wavelength of 580 nm. This optical material A7 had a specific gravity of 1.415 and a refractive index of 1.5079.

Example A8

The first specific acrylic monomer represented by the formula III and the second specific acrylic monomer represented by the formula IV in such a proportion that a ratio between both monomers was the same as in Example 6A were used in an amount of 80 parts in total. These monomers were mixed with 20 parts of 2-hydroxyethyl methacrylate, which was a monomer copolymerizable with the first mentioned monomers, thereby preparing a monomer mixture. To this monomer mixture, were added 5 parts of neodymium acetate monohydrate, and the resultant monomer composition was cast polymerized in the same manner as in Example A1, thereby producing a plastic optical material A8 in the form of a plate.

The proportions of the specific phosphate group and neodymium ion contained in this optical material A8 were 28.3% and 2.1%, respectively.

The spectral transmittances of this optical material A8 were about 42% in a wavelength range about a wavelength of 580 nm. This optical material A8 had a specific gravity of 1.425 and a refractive index of 1.5017.

Example A9

Similarly to Example A1, 31.5 parts of the first specific acrylic monomer represented by the formula III and 18.5 parts of the second specific acrylic monomer represented by the formula IV were used to prepare a monomer mixture without using any other monomer. To this monomer mixture, were added 10 parts of neodymium acetate monohydrate, and the resultant monomer composition was treated in the same manner as in Example A1, thereby producing a plastic optical material A9 in the form of a plate.

The proportions of the specific phosphate group and neodymium ion contained in this optical material A9 were 35.3% and 4.2%, respectively.

The spectral transmittances of this optical material A9 were about 27% in a wavelength range about a wavelength of 580 nm, and the optical material A9 was hence found to have marked light absorptiveness in this wavelength range.

The optical material A9 had a specific gravity of 1.473 and a refractive index of 1.5033.

Example A10

Similarly to Example A1, 31.5 parts of the first specific acrylic monomer represented by the formula III and 18.5 parts of the second specific acrylic monomer represented by the formula IV were used to prepare a monomer mixture without using any other monomer. To this monomer mixture, were added 20 parts of neodymium acetate monohydrate, and the resultant monomer composition was treated in the same manner as in Example A1, thereby producing a plastic optical material A10 in the form of a plate.

The proportions of the specific phosphate group and neodymium ion contained in this optical material A10 were 35.3% and 8.5%, respectively.

The spectral transmittances of this optical material A10 were about 10% in a wavelength range about a wavelength of 580 nm, and the optical material A10 was hence found to have marked light absorptiveness in this wavelength range.

The optical material A10 had a specific gravity of 1.488 and a refractive index of 1.5043.

Comparative Example a3

It was attempted to prepare a monomer composition in the same manner as in Example 10A except that the proportion of neodymium acetate monohydrate added was changed to 30 parts (proportion of a neodymium ion based on 100 parts of the monomer mixture: 12.8 parts). However, it was impossible to fully dissolve the neodymium acetate monohydrate in the monomer mixture. The resulting plastic material was also opaque and hence unsuitable for an optical material.

Example B1

A monomer mixture was prepared by using 31.5 parts of the first specific acrylic monomer represented by the formula III, 18.5 parts of the second specific acrylic monomer represented by the formula IV, 29 parts of methyl methacrylate, 20 parts of diethylene glycol dimethacrylate and 1 part of α-methylstyrene. To this monomer mixture, were added 30 parts of manganese benzoate tetrahydrate and 1.0 part of neodymium acetate monohydrate, and the resultant mixture was stirred and mixed at 70° C. to fully dissolve the metallic compounds in the monomer mixture, thereby obtaining a monomer composition in which manganese benzoate and neodymium acetate were dissolved in the monomer mixture.

To the monomer composition thus prepared, were added 2.0 parts of t-butyl peroxyoctanoate. The resultant mixture was subjected to cast polymerization by heating it at 45° C. for 2 hours and then at 50° C. for 2 hours, further heating from 50° C. to 60° C. over 6 hours, from 60° C. to 80° C. over 5 hours and then from 80° C. to 100° C. over 3 hours, and holding the mixture at 100° C. for 2 hours successively, thereby producing a transparent plastic optical material B1 in the form of a plate 2 mm thick, which was composed of a crosslinked acrylic polymer containing manganese and neodymium ions.

The proportions of the specific phosphate group, manganese ion $Mn^{2+}$ and neodymium ion $Nd^{3+}$ contained in this optical material B1 were 17.7%, 4.5% and 0.43%, respectively.

This optical material B1 had a specific gravity of 1.353 and a refractive index of 1.521.

The light transmittances in wavelength ranges of 400–450 nm and 555–605 nm were found from a spectral transmittance curve of this optical material B1 in a visible region (wavelength: 400–700 nm), which had been determined by means of a spectrophotometer (Automatic spectrophotometer U-4000, manufactured by Hitachi Ltd.). As a result, they were found to be 20.2% and 60.3%, respectively.

Using this optical material B1 in the form of a plate as a sample, a lighted fluorescent lamp as an object was observed through this optical material to visually evaluate it as to glare and definition (the degree of distinctness of the outline of the object) in accordance with the following methods. As a result, it was confirmed that this optical material B1 brings about (1) an improved effect of reducing the glare and (2) an improved effect of making the outline of the lamp look clear.

These measurement and evaluation results are shown in Table 1.

[Visual test for glare and definition]

A narrow-band lighting fluorescent lamp (three-band type EX-N, demand: 27 W, due to JIS C7601) was lighted, and this lamp was observed by naked eyes through the sample at a distance of 50 cm, thereby evaluating the sample as to whether (1) the degree of glare is reduced or not, and (2) the definition of the outline of the lighted fluorescent lamp as the object is improved or not as compared with the case where the object was directly observed through no sample in accordance with the following standard:

Evaluation standard:

A: An improving effect was brought about;

B: It was a toss-up whether improvement was made or not;

C: It showed no sign of improvement.

Example B2

Cast polymerization was performed in the same manner as in Example B1 except that 44.1 parts of the first specific acrylic monomer represented by the formula III, 25.9 parts of the second specific acrylic monomer represented by the formula IV, 23.5 parts of manganese benzoate tetrahydrate and 3.5 parts of neodymium acetate monohydrate were used in place of their corresponding components in Example B1, and diethylene glycol dimethacrylate was omitted in the preparation of the monomer composition, thereby producing a transparent plastic optical material B2 in the form of a plate 2 mm thick.

Example B3

A transparent plastic optical material B3 in the form of a plate 2 mm thick was produced in the same manner as in Example B1 except that the proportions of manganese benzoate tetrahydrate and neodymium acetate monohydrate used in the preparation of the monomer composition in Example B1 were changed to 20 parts and 7 parts, respectively, and 0.2 part of an ultraviolet absorbent "Biosorb 583" (product of Kyodo Chemical Co., Ltd.) was added.

Example B4

A transparent plastic Optical material B4 in the form of a plate 2 mm thick was produced in the same manner as in Example B1 except that the proportions of manganese benzoate tetrahydrate and neodymium acetate monohydrate used in the preparation of the monomer composition in Example B1 were changed to 4 parts and 1 part, respectively.

Example B5

A transparent plastic optical material B5 in the form of a plate 2 mm thick was produced in the same manner as in Example B1 except that 49 parts of 2-hydroxyethyl methacrylate were used in place of 20 parts of diethylene glycol dimethacrylate and 29 parts of methyl methacrylate in the preparation of the monomer mixture in Example B1, and the proportions of manganese benzoate tetrahydrate and neodymium acetate monohydrate used in the preparation of the monomer composition in Example B1 were changed to 35 parts and 11 parts, respectively.

Comparative Example b1

A monomer mixture was prepared by thoroughly mixing 6.3 parts of the first specific acrylic monomer represented by the formula III, 3.7 parts of the second specific acrylic monomer represented by the formula IV, 20 parts of diethylene glycol dimethacrylate, 29 parts of methyl methacrylate, 40 parts of 2-hydroxy-ethyl methacrylate and 1 part of α-methylstyrene.

To this monomer mixture, were added 5 parts of manganese benzoate tetrahydrate, and the resultant mixture was blended to prepare a monomer composition. This monomer composition was subjected to cast polymerization in the same manner as in Example B1, thereby producing a transparent plastic material b1 in the form of a plate 2 mm thick. This plastic material b1 contained no neodymium ion.

Referential Example c1

To a monomer mixture prepared in the same manner as in Example B1, were added 10 parts of neodymium acetate monohydrate and 0.2 part of an ultraviolet absorbent, "Biosorb 583" (product of Kyodo Chemical Co., Ltd.). The resultant mixture was thoroughly blended into a solution, thereby preparing a monomer composition.

To this monomer composition, were added 2.0 parts of t-butyl peroxypivalate. The resultant mixture was subjected to cast polymerization under the same temperature and time conditions as in Example B1, thereby producing a transparent plastic material c1 in the form of a plate 2 mm thick. This plastic material c1 contained no manganese ion.

With respect to each of the optical materials B2 to B5 and plastic materials b1 and c1 produced in the above-described manner, the proportions of the specific phosphate group, manganese ion and neodymium ion contained, specific gravity, refractive index, light transmittances in wavelength ranges of 400–450 nm and 555–605 nm, and properties as to glare proofness and definition were measured or determined in the same manner as in Example B1. The results are shown in Table 1.

TABLE 1

| Sample | \multicolumn{7}{c|}{Plastic optical material} |
| --- | --- | --- | --- | --- | --- | --- | --- |
|  | B1 | B2 | B3 | B4 | B5 | b1 | c1 |
| Proportion (%) | | | | | | | |
| Phosphate gp. | 17.7 | 24.8 | 17.7 | 17.7 | 17.7 | 3.54 | 17.7 |
| Manganese ion | 4.5 | 3.5 | 3.0 | 0.60 | 5.2 | 0.75 | — |
| Neodymium ion | 0.43 | 1.5 | 2.9 | 0.43 | 4.7 | — | 4.3 |

TABLE 1-continued

| Sample | \multicolumn{7}{c|}{Plastic optical material} |
| --- | --- | --- | --- | --- | --- | --- | --- |
|  | B1 | B2 | B3 | B4 | B5 | b1 | c1 |
| Refractive index ($n_D$) | 1.521 | 1.520 | 1.517 | 1.520 | 1.523 | — | — |
| Specific gravity | 1.353 | 1.358 | 1.360 | 1.350 | 1.368 | — | — |
| Transmittance (%) | | | | | | | |
| 400–500 nm | 20.2 | 30.0 | 19.9 | 76.6 | 3.2 | 54.2 | 87.1 |
| 555–605 nm | 60.3 | 71.0 | 65.6 | 84.6 | 24.7 | 87.4 | 68.5 |
| Visual test | | | | | | | |
| Definition | A | A | A | A | A | B | C |
| Glare Proofness | A | A | A | A | A | C | A |

What is claimed is:

1. A plastic optical material comprising 100 parts by mass of an acrylic polymer containing a specific phosphate group represented by the formula $$PO(OH)_n \quad (n \text{ is } 1 \text{ or } 2)$$

in a proportion of 0.5–60 mass %, and a metal ion component comprising a neodymium ion in a proportion of 0.04–10 parts by mass based on 100 parts by mass of the acrylic polymer;

wherein the specific phosphate group contained in the acrylic polymer is chemically bonded to a molecular structure constituting the acrylic polymer; and the acrylic polymer is a copolymer obtained by polymerizing a monomer mixture composed of a monomer represented by the following formula I:

$$PO(OH)_n R_{3-n} \quad \text{(I)}$$

wherein R means a polymerizable functional group represented by the following formula II:

$$CH_2=CXCOO(C_2H_4O)_m- \quad \text{II}$$

(X denotes a hydrogen atom or a methyl group, and m is an integer of 0–5) and n is 1 or 2, and at least one monomer copolymerizable therewith.

2. The plastic optical material according to claim 1, wherein the metal ion component comprises a neodymium ion and at least one of other metal ions, and a proportion of the neodymium ion is at least 50 mass % of the whole metal ions.

3. The plastic optical material according to claim 2, wherein the metal ion component comprises a neodymium ion and a nickel ion.

4. A process for producing a plastic optical material, which comprises the step of polymerizing a monomer mixture composed of a monomer represented by the following formula I:

$$PO(OH)_n R_{3-n} \quad \text{I}$$

wherein R means a polymerizable functional group represented by the following formula $$CH_2=CXCOO(C_2H_4O)_m- \quad \text{II}$$

(X denotes a hydrogen atom or a methyl group, and m is an integer of 0–5) and n is 1 or 2, and at least one monomer copolymerizable therewith, said mixture providing a copolymer containing a specific phosphate group represented by the formula $PO(OH)_n$— (n being 1 or 2)

in a proportion of 0.5–60 mass %, in the presence of a neodymium compound in such an amount that a proportion of a neodymium ion to be contained in a copolymer to be formed comes to 0.04–10 parts by mass based on 100 parts by mass of the copolymer.

5. The process according to claim 4, wherein the step of polymerizing the monomer mixture is conducted in the presence of at least one of other metal ions in such an amount that a proportion of the other metal ions to be contained in the copolymer to be formed will be not higher than that of the neodymium ion to be contained.

6. A plastic optical material comprising 100 parts by mass of an acrylic polymer containing a specific phosphate group represented by the formula $PO(OH)_n$— (n is 1 or 2)

in a proportion of 0.5–60 mass %, and 0.1–12 parts by mass of a metal ion component composed of manganese ion ($Mn^{2+}$) and a neodymium ion ($Nd^{3+}$) and comprising the manganese ion in a predominant amount;

wherein the specific phosphate group contained in the acrylic polymer is chemically bonded to a molecular structure constituting the acrylic polymer; and the acrylic polymer is a copolymer obtained by polymerizing a monomer mixture composed of a monomer represented by the following formula I:

$$PO(OH)_n(OH)_nR_{3-n} \qquad \text{I}$$

wherein R means a polymerizable functional group represented by the following formula II:

$$CH_2=CXCOO(C_2H_4O)_m— \qquad \text{II}$$

(X denotes a hydrogen atom or a methyl group, and m is an integer of 0–5) and n is 1 or 2, and at least one monomer copolymerizable therewith.

7. The plastic optical material according to claim 6, wherein a mass ratio ($Mn^{2+}/Nd^{3+}$) of the manganese ion ($Mn^{2+}$) to the neodymium ion ($Nd^{3+}$) is within a range of 1–19.

8. A process for producing a plastic optical material, which comprises the step of polymerizing a monomer mixture composed of a monomer represented by the following formula I:

$$PO(OH)_nR_{3-n} \qquad \text{I}$$

wherein R means a polymerizable functional group represented by the following formula II:

$$CH_2=CXCOO(C_2H_4O)_m— \qquad \text{II}$$

(X denotes a hydrogen atom or a methyl group, and m is an integer of 0–5) and n is 1 or 2, and at least one monomer copolymerizable therewith, said mixture providing a copolymer containing a specific phosphate group represented by the formula $PO(OH)_n$— (n being 1 or 2)

in a proportion of 0.5–60 mass %, in the presence of metal compounds in such an amount that a proportion of a metal ion component, which is composed of a manganese ion ($Mn^{2+}$) and a neodymium ion ($Nd^{3+}$) and comprises the manganese ion in a predominant amount, to be contained in a copolymer to be formed comes to 0.1–12 parts by mass based on 100 parts by mass of the copolymer.

* * * * *